United States Patent
Von Bülow et al.

(10) Patent No.: US 11,444,279 B2
(45) Date of Patent: Sep. 13, 2022

(54) HIGH TAP DENSITY LITHIUM POSITIVE ELECTRODE ACTIVE MATERIAL, INTERMEDIATE AND PROCESS OF PREPARATION

(71) Applicant: HALDOR TOPSØE A/S, Kgs. Lyngby (DK)

(72) Inventors: Jon Fold Von Bülow, Copenhagen N (DK); Søren Dahl, Hillerød (DK); Jonathan Højberg, Kgs. Lyngby (DK); Jakob Weiland Høj, Gentofte (DK)

(73) Assignee: HALDOR TOPSØE A/S, Kgs. Lyngby (DK)

( * ) Notice: Subject to any disclaimer, the term of this patent is extended or adjusted under 35 U.S.C. 154(b) by 3 days.

(21) Appl. No.: 16/839,564

(22) Filed: Apr. 3, 2020

(65) Prior Publication Data
US 2020/0243858 A1    Jul. 30, 2020

Related U.S. Application Data (62) Division of application No. 15/753,664, filed as application No. PCT/EP2016/069961 on Aug. 24, 2016, now Pat. No. 10,651,467.

(30) Foreign Application Priority Data

Aug. 27, 2015    (DK) .......................... PA 2015 00509

(51) Int. Cl.
*H01M 4/505*    (2010.01)
*H01M 4/525*    (2010.01)
(Continued)

(52) U.S. Cl.
CPC ............ *H01M 4/505* (2013.01); *C01G 53/54* (2013.01); *H01M 4/525* (2013.01);
(Continued)

(58) Field of Classification Search
CPC .. H01M 4/505; H01M 10/0525; H01M 4/525; H01M 2004/028; C01G 53/54;
(Continued)

(56) References Cited

U.S. PATENT DOCUMENTS

| 5,449,577 A | 9/1995 | Dahn et al. |
| 7,754,384 B2 | 7/2010 | Patoux et al. |

(Continued)

FOREIGN PATENT DOCUMENTS

| CN | 101084161 A | 12/2007 |
| CN | 102774891 A | 11/2012 |

(Continued)

OTHER PUBLICATIONS

Office Action (The First Office Action) dated Jul. 18, 2020, by the State Intellectual Property Office of the People's Republic of China in corresponding Chinese Patent Application No. 201680049558.6, and an English Translation of the Office Action. (14 pages).

(Continued)

*Primary Examiner* — Andrew J. Oyer
(74) *Attorney, Agent, or Firm* — Buchanan Ingersoll & Rooney P.C.

(57) ABSTRACT

A lithium positive electrode active material intermediate including less than 80 wt % spinel phase and a net chemical composition of $Li_xNi_yMn_{2-y}O_{4-\delta}$ wherein $0.9 \leq x \leq 1.1$; $0.4 \leq y \leq 0.5$; and $0.1 \leq \delta$. Further, a process for the preparation of a lithium positive electrode active material with high tap density for a high voltage secondary battery where the cathode is fully or partially operated above 4.4 V vs. Li/Li+, comprising the steps of a) heating a precursor in a reducing atmosphere at a temperature of from 300° C. to 1200° C. to obtain a lithium positive electrode active material intermediate; b) heating the product of step a. in a non-reducing atmosphere at a temperature of from 300° C. to 1200° C.;

(Continued)

wherein the mass of the product of step b. increases by at least 0.25% compared to the mass of the product of step a.

13 Claims, 9 Drawing Sheets

(51) Int. Cl.
    *C01G 53/00*     (2006.01)
    *H01M 10/0525*     (2010.01)
    *H01M 4/02*     (2006.01)

(52) U.S. Cl.
    CPC ..... *H01M 10/0525* (2013.01); *C01P 2002/32* (2013.01); *C01P 2004/61* (2013.01); *C01P 2006/11* (2013.01); *C01P 2006/40* (2013.01); *H01M 2004/028* (2013.01)

(58) Field of Classification Search
    CPC .. C01G 53/44; C01P 2002/32; C01P 2004/61; C01P 2006/11; C01P 2006/40; Y02E 60/10
    See application file for complete search history.

(56) References Cited

U.S. PATENT DOCUMENTS

| | | | |
|---|---|---|---|
| 8,404,381 B2* | 3/2013 | Jouanneau | C01G 53/54 252/519.15 |
| 2012/0068129 A1 | 3/2012 | Jouanneau et al. | |
| 2014/0034872 A1 | 2/2014 | Watanabe et al. | |
| 2014/0353547 A1 | 12/2014 | Mitsumoto et al. | |
| 2015/0155547 A1 | 6/2015 | Tenzer et al. | |
| 2019/0006668 A1 | 1/2019 | Von Bülow et al. | |

FOREIGN PATENT DOCUMENTS

| | | |
|---|---|---|
| CN | 102856542 A | 1/2013 |
| EP | 1142834 A1 | 10/2001 |
| EP | 2239805 A1 | 10/2010 |
| JP | 2005025975 A | 1/2005 |
| JP | 2013010677 A | 1/2013 |

OTHER PUBLICATIONS

Fang X. et al. "Electrochemical properties of nano- and micro-sized LiNi0.5Mn1.5O4 synthesized via thermal decomposition of a ternary eutectic Li—Ni—Mn acetate" Electrochimica Acta, vol. 55, pp. 832-837, 2010.

Lee M. H. et al. "Synthetic optimization of Li[Ni1/3Co1/3Mn1/3]O2 via co-precipitation" Electrochimica Acta, vol. 50, pp. 939-948, 2004.

Danish Search Report dated Apr. 4, 2016, by the Danish Patent and Trademark Office for Danish Patent Application No. PA 2015 00509.

International Search Report (PCT/ISA/210) dated Oct. 25, 2016, by the European Patent Office as the International Searching Authority for International Application No. PCT/EP2016/069961.

Written Opinion (PCT/ISA/237) dated Oct. 25, 2016, by the European Patent Office as the International Searching Authority for International Application No. PCT/EP2016/069961.

Xiao J. et al. "High-Performance LiNi 0.5 Mn 1.5 O 4 Spinel Controlled by Mn 3 + Concentration and Site Disorder" Adv. Mater., vol. 24, pp. 2109-2116, 2012.

Zhong Q, et al." Synthesis and Electrochemistry of LiNiMn2_O4" J. Electrochem. Soc., vol. 144, No. 1, pp. 205-213, 1997.

Zhu Z. et al. "Preparation of spherical hierarchical LiNi0.5Mn1. 5O4with highelectrochemical performances by a novel composite co-precipitationmethod for 5 V lithium ion secondary batteries" Electrochimica Acta, vol. 115, pp. 290-296, 2014.

Particle Size Characterization, NIST, Special Publication 960-1, (167 pages), 2001.

\* cited by examiner

HIGH TAP DENSITY LITHIUM POSITIVE ELECTRODE ACTIVE MATERIAL, INTERMEDIATE AND PROCESS OF PREPARATION

CROSS REFERENCE TO RELATED APPLICATIONS

The present application is a divisional of U.S. application Ser. No. 15/753,664, filed on Feb. 20, 2018, which is a U.S. National Stage of International Application No. PCT/EP2016/069961, filed on Aug. 24, 2016, which claims the benefit of Danish Application No.PA 2015 00509, filed on Aug. 27, 2015. The entire contents of each of U.S. application Ser. No. 15/753,664, International Application No. PCT/EP2016/069961, and Danish Application No.PA 2015 00509 are hereby incorporated herein by reference in their entirety.

BACKGROUND

The present invention relates to a novel process of preparation and intermediate for the preparation of lithium positive electrode active materials for use in lithium secondary batteries.

Lithium positive electrode active materials may be characterised by the formula $Li_xNi_yMn_{2-y}O_{4-\delta}$ wherein $0.9 \leq x \leq 1.1$, $0.4 \leq y \leq 0.5$ and $0 \leq \delta \leq 0.1$. Such materials may be used for e.g.: portable equipment (U.S. Pat. No. 8,404,381 B2); electric vehicles, energy storage systems, auxiliary power units (APU) and uninterruptible power supplies (UPS). Lithium positive electrode active materials are seen as a prospective successor to current lithium secondary battery cathode materials such as: $LiCoO_2$, and $LiMn_2O_4$.

Lithium positive electrode active materials may be prepared from precursors obtained by a co-precipitation process. The precursors and product are spherical due to the co-precipitation process. Electrochimica Acta (2014), pp 290-296 discloses a material prepared from precursors obtained by a co-precipitation process followed by sequential sintering (heat treatment) at 500° C., followed by 800° C. The product obtained is highly crystalline and has a spinel structure after the first heat treatment step (500° C.). A uniform morphology, tap density of 2.03 g cm$^{-3}$ and uniform secondary particle size of 5.6 μm of the product is observed. Electrochimica Acta (2004) pp 939-948 states that a uniform distribution of spherical particles exhibits a higher tap density than irregular particles due to their greater fluidity and ease of packing. It is postulated that the hierarchical morphology obtained and large secondary particle size of the $LiNi_{0.5}Mn_{1.5}O_4$ increases the tap density.

Electrochimica Acta (2010) pp 832-837 also discloses an increase in the secondary particle size of spinel $LiNi_{0.5}Mn_{1.5}O_4$ material by calcination of the material at increasing temperatures, e.g. greater than 800° C. According to the Electrochimica Acta (2004) pp 939-948 reference, it may be assumed that the increase in particle size increases the tap density.

Lithium positive electrode active materials may also be prepared from precursors obtained by mechanically mixing starting materials to form a homogenous mixture, as disclosed in U.S. Pat. No. 8,404,381 B2 and 7,754,384 B2. The precursor is heated at 600° C., annealed between 700 and 950° C., and cooled in a medium containing oxygen. It is disclosed that the 600° C. heat treatment step is required in order to ensure that the lithium is well incorporated into the mixed nickel and manganese oxide precursor. It is also disclosed that the annealing step is generally at a temperature greater than 800° C. in order to cause a loss of oxygen while creating the desired spinel morphology. It is further disclosed that subsequent cooling in an oxygen containing medium enables a partial return of oxygen. U.S. Pat. No. 7,754,384 B2 is silent with regard to the tap density of the material. It is also disclosed that 1 to 5 mole percent excess of lithium is used to prepare the precursor.

J. Electrochem. Soc. (1997) 144, pp 205-213; also discloses the preparation of spinel $LiNi_{0.5}Mn_{1.5}O_4$ from a precursor prepared from mechanically mixing starting materials to obtain a homogenous mixture. The precursor is heated three times in air at 750° C. and once at 800° C. It is disclosed that $LiNi_{0.5}Mn_{1.5}O_4$ loses oxygen and disproportionates when heated above 650° C.; however, the $LiNi_{0.5}Mn_{1.5}O_4$ stoichiometry is regained by slow cooling rates in an oxygen containing atmosphere. Particle sizes and tap densities are not disclosed. It is also disclosed that the preparation of spinel phase material by mechanically mixing starting materials to obtain a homogenous mixture is difficult, and a precursor prepared by a sol-gel method was preferred.

It is desirable to increase the tap density of battery materials as an increase in tap density may increase the energy density of the battery. Additionally, it is desirable to produce a spinel phase material corresponding to the formula $LiNi_xMn_{2-x}O_4$ that requires a smaller excess expensive starting materials, such as materials comprising lithium, that may have fewer process steps (heating steps), and/or is applicable to any precursor regardless of the process of its preparation.

It is an object of the present invention to provide a lithium positive electrode active material intermediate and a process for preparing a spinel lithium positive electrode active material corresponding to the formula $LiNi_xMn_{2-x}O_4$ that has a high tap density equal to or greater than 1.8 g cm$^{-3}$. It is additionally desirable that this material has a high capacity equal to or greater than 110 mAhg$^{-1}$ at a current of 30 mAg$^{-1}$, and high stability wherein the capacity of the material decreases by no more than 7% over 100 cycles between from 3.5 to 5.0 V at 55° C., and up to 2% over 100 cycles between from 3.5 to 5.0 V at room temperature.

SUMMARY OF THE INVENTION

It has now been discovered that lithium positive electrode active materials with a high tap density and corresponding high tap density intermediates may be obtainable through a process of preparing the lithium positive electrode active material comprising a heating step under a reducing atmosphere.

An aspect of the present invention relates to a lithium positive electrode active material intermediate comprising less than 80 wt % spinel phase and a net chemical composition of $Li_xNi_yMn_{2-y}O_{4-\delta}$ wherein:

$0 \leq x \leq 1.1$;
$0.4 \leq y \leq 0.5$;
$0.1 \leq \delta$;

and has been heat treated in a reducing atmosphere at a temperature of from 300° C. to 1200° C. Preferably $0.1 < \delta$ and the tap density is equal to or greater than 1.8 g cm$^{-3}$. Even though no upper limit to $\delta$ is indicated above, it is self-evident that an upper limit to $\delta$ exists. Such an upper limit is less than 4; preferably, an upper limit to 5 is about 1; more preferably, the upper limit to 5 is about 2. Typically, the lithium positive electrode active material intermediate comprises between from 0 to 70 wt % spinel phase, such as between from 0 to 65 wt % spinel phase.

The lithium positive electrode active material intermediate may comprise products formed from starting materials that are partly or fully decomposed in the heat treatment in a reducing atmosphere at a temperature of from 300° C. to 950° C. These products may comprise from 1 to 100 wt % rocksalt phase; between from 5 to 80 wt % rocksalt phase. For example, metallic Ni may be present during the heat treatment in reducing atmosphere.

When analysed ex-situ, the phase composition of the intermediate may have changed due to possible reactions during cooling in a reactive gas. Such a reactive gas could be air. If it is only possible to measure the phase composition ex-situ, the most accurate method is to quench the sample in liquid $N_2$ immediately after extracting the sample from the hot furnace.

When x=0 in the net chemical composition $Li_xNi_yMn_{2-y}O_{4-\delta}$, no Li containing starting material has yet been added; the Li containing starting material will be added after the heat treatment in a reducing atmosphere; viz. prior to a subsequent heat treatment in a non-reducing atmosphere. For other values of x within the range 0≤x≤1.1, Li containing starting material has been added prior to heat treatment in a reducing atmosphere. Substantially all the Li containing starting material needed may have been added before the heat treatment in the reducing atmosphere, or some Li containing starting material may be added before heat treatment in a reducing atmosphere and some Li containing starting material may be added after the heat treatment in a reducing atmosphere.

"Spinel phase" means a crystal lattice where the oxide anions are arranged in a cubic close-packed lattice and the cations are occupying some or all of the octahedral and tetrahedral sites in the lattice. The symmetry of the spinel lattice is described by space groups of $P4_332$ for the cation ordered phase and Fd-3m for the cation disordered phase with a lattice constant a at around 8.2 Å. Spinel material may be a single disordered or ordered phase, or a mix of both. Adv. Mater. (2012) 24, pp 2109-2116.

"Rocksalt phase" means a cubic close-packed crystal lattice where the oxide anions are arranged in a cubic close-packed lattice and the cations are occupying the octahedral sites in the lattice. The symmetry of the rocksalt lattice is described by space group of Fm-3m with a lattice constant $\alpha$ at around 4.2 Å.

"Phase composition" is determined based on X-ray diffraction patterns acquired using an X'pert PRO MPD diffractometer, using Cu Kα radiation. Structural analysis is performed using Rietveld refinement in the Bruker software TOPAS. The phase composition is given in wt % with a typical uncertainty of 1-2 percentage points, and represents the relative composition of all crystalline phases. Any amorphous phases are thus not included in the phase composition.

The material that comprise the lithium positive electrode active material intermediate may also comprise separate phases containing only Li as cation such as, but not limited to, $Li_2CO_3$ and LiOH that can have been added before the heat treatment in a reducing atmosphere and that are not fully decomposed. Any such Li phase is not included in the net chemical composition of the intermediate, since such Li phases are not part of the active material intermediate. Thus, the term "Li phase" is meant to denote a distinct phase where the only metal/cation is Li.

The term that the lithium positive electrode active material intermediate has been "heat treated in a reducing atmosphere to a specified temperature" is meant to denote that the lithium positive electrode active material intermediate has been heated for a sufficient time range for the intermediate to at least substantially reach the specified temperature in a reducing atmosphere.

An embodiment of the present invention relates to a lithium positive electrode active material intermediate, wherein 0.9≤x≤1.1 in the net chemical composition $Li_xNi_yMn_{2-y}O_{4-\delta}$.

The other values, y and δ are as indicated above, viz. 0.4≤y≤0.5; and 0.1≤δ. In this embodiment, substantially all the Li starting material needed has been added before the heat treatment in the reducing atmosphere.

An embodiment of the present invention relates to lithium positive electrode active materials prepared via a novel lithium positive electrode active material intermediate wherein the tap density of the intermediate is equal to or greater than 1.8 g cm$^{-3}$. Preferably, the tap density of the intermediate is equal to or greater than 2.0 g cm$^{-3}$; equal to or greater than 2.2 g cm$^{-3}$; equal to or greater than 2.4 g cm$^{-3}$; or equal to or greater than 2.6 g cm$^{-3}$.

In an embodiment, the precursor for the lithium positive electrode active material intermediate has been produced from two or more starting materials, where the starting materials have been partly or fully decomposed by heat treatment. Such starting materials are e.g. a nickel-manganese carbonate and a lithium carbonate, or a nickel-manganese carbonate and a lithium hydroxide, or a nickel-manganese hydroxide and a lithium hydroxide, or a nickel-manganese hydroxide and a lithium carbonate, or a manganese oxide and a nickel carbonate and a lithium carbonate.

In an embodiment, the intermediate further comprises up to 2 mol % other elements than Li, Ni, Mn and O. Such elements may for example be one or more of the following: B, N, F, Mg, Al, Si, P, S, Ca, Ti, Cr, Fe, Co, Cu, Zn, Zr, Mo, Sn, W, any mixture thereof or any chemical composition containing one or more of these compounds. The dopants may originate from addition or from impurities in starting materials.

Another aspect of the invention relates to a process for the preparation of a lithium positive electrode active material for a high voltage secondary battery where the cathode is fully or partially operated above 4.4 V vs. Li/Li+, comprising the steps of:
 a. Heat treating a precursor in a reducing atmosphere at a temperature of from 300° C. to 1200° C. to obtain a lithium positive electrode active material intermediate;
 b. Heat treating the product of step a. in a non-reducing atmosphere at a temperature of from 700° C. to 1200° C.;
 where the mass of the product of step b., viz. the lithium positive electrode active material, increases by at least 0.25% compared to the mass of the product of step a, viz. the lithium positive electrode active material intermediate. The increase of the mass of the product of step b. compared to the product of step a. is due to oxidation of the lithium positive electrode active material intermediate of step a. taking place during step b.

The product of steps a. and b. may optionally be cooled after heating and, once cooled, they may be isolated. Alternatively, the process comprising the steps: a. and b., may be carried out consecutively, without cooling and the products of step a. or b. are not isolated. Steps a. and b. may be repeated as required.

The mass of the product of step b., viz. the lithium positive electrode active material, may increase by at least 0.75%; at least 1.0%; at least 1.5%; at least 2.0%; at least 4.0%; at least 8.0%; compared to the mass of the product of step a., viz. the lithium positive electrode active material intermediate.

"Heat treating" means treating a material at a temperature or temperature range in order to obtain the desired crystallinity. The temperature or temperature range is intended to represent the temperature of the material being heat treated. Typical heat treatment temperatures are about 500° C., about 600° C., about 700° C., about 800° C., about 900° C., about 1000° C. and temperature ranges are from about 300 to about 1200° C.; from about 500 to about 1000° C.; from 650 to 950° C. The term "heat treatment at a temperature of between X and Y° C." is not meant to be limiting to one specific temperature between X and Y; instead, the term also encompasses heat treatment to a range of temperatures within the temperature span from X to Y during the time of the heating.

"Cooling" means treating a material at a temperature or temperature range that is gradually lowered in order to reduce the temperature of the material. Typical cooling conditions are cooling at between 1° C. and 5° C. per minute when lowering the temperature from 900° C. to 700° C. Optionally, the material may be cooled to, for example, 600° C., 500° C., 400° C., 300° C., 200° C., 100° C., 50° C., room temperature (i.e. about 25° C.).

In embodiments of the process, the temperature of step a. is between 300° C. and 950° C., preferably between 400° C. and 750° C., more preferably between 550° C. and 650° C. In embodiments of the process, the temperature of step b. is between 800° C. and 1200° C., preferably between 900° C. and 1200° C., more preferably between 950° C. and 1150° C.

In an embodiment of the process, the reducing atmosphere is a gaseous composition selected from the group of nitrogen, less than 15 vol % oxygen in an inert gas, air and hydrogen, air and carbon monoxide, air and carbon dioxide, air and methanol, and mixtures thereof. Preferably, the reducing atmosphere comprises less than 5 vol % oxygen, more preferably less than 3 vol % oxygen and even more preferably less than 1 vol % oxygen. More preferably, the amount of oxygen in the reducing atmosphere is even lower, such as below 1000 ppm and most preferably below 10 ppm.

"Precursor" means a composition prepared by mechanically mixing or co-precipitating starting materials to obtain a homogenous mixture (Journal of Power Sources (2013) 238, 245-250); mixing a lithium source with a composition prepared by mechanically mixing starting materials to obtain a homogenous mixture (Journal of Power Sources (2013) 238, 245-250); or mixing a lithium source with a composition prepared by co-precipitation of starting materials (Electrochimica Acta (2014) 115, 290-296).

Starting materials are selected from one or more compounds selected from the group consisting of metal oxide, metal carbonate, metal oxalate, metal acetate, metal nitrate, metal sulphate, metal hydroxide and pure metals; wherein the metal is selected from the group consisting of nickel (Ni), manganese (Mn) and lithium (Li) and mixtures thereof. Preferably, the starting materials are selected from one or more compounds selected from the group consisting of manganese oxide, nickel oxide, manganese carbonate, nickel carbonate, manganese sulphate, nickel sulphate, manganese nitrate, nickel nitrate, lithium hydroxide, lithium carbonate and mixtures thereof. Metal oxidation states of starting materials may vary; e.g. MnO, $Mn_3O_4$, $Mn_2O_3$, $MnO_2$, Mn(OH), MnOOH, $Ni(OH)_2$, NiOOH.

"Intermediate" means a product of a step that is not the final step of the process. For example, the product of step a. is an intermediate of the process comprising steps a. and b. as the product of step a. is used in the subsequent step b.

In an embodiment, the reducing atmosphere is created by adding a substance to the precursor composition, by decomposition of the precursor or by adding a gaseous composition to the atmosphere in order to remove all or part of any oxidising species present in the atmosphere. Preferably no ambient air can enter the reaction vessel.

"Reducing atmosphere" means an atmosphere that shifts the thermodynamic equilibrium of the solid towards a distribution of phases with an average oxidation state of the metals lower than in the Spinel phase at the relevant heat treatment temperature; i.e. the average oxidation state of Mn and Ni is less than or equal to +3.4 in the case where x=1 and δ=0.1 in the formula $Li_xNi_yMn_{2-y}O_{4-\delta}$. The reducing atmosphere may be provided by the type of gas present within the reaction vessel during heating. This gas may be provided by the presence of a reducing gas; for example, the reducing gas may be one or more gases selected from the group of: hydrogen; carbon monoxide; carbon dioxide; nitrogen; less than 15 vol % oxygen in an inert gas; and mixtures thereof. The term "less than 15 vol % oxygen in an inert gas" is meant to cover the range from 0 vol % oxygen, corresponding to an inert gas without oxygen, up to 15 vol % oxygen in an inert gas. Preferably, the amount of oxygen in the reducing atmosphere is low, such as below 1000 ppm and most preferably below 10 ppm. Typically, oxygen would not be added to the atmosphere; however, oxygen may be formed during the heating.

"Inert gas" means a gas that does not participate in the process. Examples of inert gasses comprise one or more gases selected from the group of: argon; nitrogen; helium; and mixtures thereof.

Additionally, the term "reducing atmosphere" is meant to comprise a composition comprising two or more gases, wherein one gas is considered a non-reducing atmosphere gas when used independently of other gasses, and a second gas or substance that decreases the oxidising potential of the gas mixture. The total reducing ability of the atmosphere corresponds to a reducing atmosphere. Such a composition may be selected from the group comprising: nitrogen, less than 15 vol % oxygen in an inert gas, air and hydrogen; air and CO; air and methanol; air and carbon dioxide.

Additionally, a "reducing atmosphere" may be obtained by adding a substance to the precursor composition or by adding a gaseous composition to the atmosphere in order to remove all or part of any oxidising species present in the atmosphere of the reaction vessel during heating. The substance may be added to the precursor either during the preparation of the precursor or prior to heat treatment. The substance may be any material that can be oxidised and preferably comprising carbon, for example, the substance may be one or more compounds selected from the group consisting of graphite, acetic acid, carbon black, oxalic acid, wooden fibres and plastic materials.

"Non-reducing atmosphere" means an atmosphere that shifts the thermodynamic equilibrium of the solid towards the Spinel phase when the temperature is below 700° C.; an example is that a non-reducing atmosphere below 700° C. may change the average oxidation state of Mn and Ni from a value less than or equal to +3.4 to a value of +3.5 in the case where x=1 in the formula $Li_xNi_yMn_{2-y}O_{4-\delta}$. Said change in the average oxidation state of Mn and Ni corresponds to a change in δ from δ≥0.1 to δ=0.

In an embodiment, the non-reducing atmosphere is a gaseous composition selected from the group consisting of air, and a composition comprising at least 5 vol % oxygen in an inert gas. The non-reducing atmosphere may be provided by the type of gas present within the reaction vessel during heating. Preferably, the non-reducing gas is air.

The lithium positive electrode active material has an initial specific discharge capacity of equal to or greater than 110 mAhg$^{-1}$; equal to or greater than 120 mAhg$^{-1}$; equal to or greater than 125 mAhg$^{-1}$; equal to or greater than 130 mAhg$^{-1}$. When discharged using a 30 mAg$^{-1}$ current. Discharge capacities and discharge currents in this document are stated as specific values based on the mass of the active material.

The specific capacity of the lithium positive electrode active material decreases by no more than 7% over 100 charge-discharge cycles between from 3.5 to 5.0 V; decreases by no more than 5% over 100 charge-discharge cycles between from 3.5 to 5.0 V when cycled at 55° C. with charge and discharge currents of 74 mAg$^{-1}$ and 148 mAg$^{-1}$, respectively. Cell types and testing parameters are provided in the Examples.

The specific capacity of the lithium positive electrode active material decreases by no more than 2% over 100 charge-discharge cycles between from 3.5 to 5.0 V; decreases by no more than 1% over 100 charge-discharge cycles between from 3.5 to 5.0 V when cycled at room temperature with charge and discharge currents of 74 mAg$^{-1}$ and 148 mAg$^{-1}$, respectively. Cell types and testing parameters are provided in the Examples.

The process further relates to a lithium positive electrode active material with a tap density of equal to or greater than 1.8 g cm$^{-3}$; from 1.8 to 3.5 g cm$^{-3}$, from 2.0 to 3.5 g cm$^{-3}$, from 2.1 to 3.5 g cm$^{-3}$.

"Tap density" is the term used to describe the bulk density of a powder (or granular solid) after consolidation/compression prescribed in terms of 'tapping' the container of powder a measured number of times, usually from a predetermined height. The method of 'tapping' is best described as 'lifting and dropping'. Tapping in this context is not to be confused with tamping, sideways hitting or vibration. The method of measurement may affect the tap density value and therefore the same method should be used when comparing tap densities of different materials. The tap densities of the present invention are measured by weighing a measuring cylinder before and after addition of at least 10 g of powder to note the mass of added material, then tapping the cylinder on the table for some time and then reading of the volume of the tapped material. Typically, the tapping should continue until further tapping would not provide any further change in volume. As an example only, the tapping may be about 120 or 180 times, carried out during a minute.

For lithium positive electrode active materials prepared from the heat treatment of a precursor prepared by mechanically mixing starting materials to obtain a homogenous mixture, the lithium positive electrode active material intermediate (the product of step a.) may be prepared in order to obtain a particle size distribution of D10 of greater than 100 μm, D50 of greater than 250 μm and D90 of greater than 800 μm; preferably a D10 of about 10 μm, D50 of about 20 μm and D90 of about 30 μm.

The process further relates to a lithium positive electrode active material prepared from the heat treatment of a precursor prepared by mechanically mixing starting materials to obtain a homogenous mixture wherein the secondary particle size of the product of step b. may be prepared in order to obtain a particle size distribution of D10 of greater than 100 μm, D50 of greater than 250 μm and D90 of greater than 800 μm; preferably a D10 of about 10 μm, D50 of about 20 μm and D90 of about 30 μm.

The particle size distribution values D10, D50 and D90 are defined and measured as described in Jillavenkatesa A, Dapkunas S J, Lin-Sien Lum: Particle Size Characterization, NIST (National Institute of Standards and Technology) Special Publication 960-1, 2001.

In an embodiment, the precursor is prepared by one or more processes selected from the group consisting of mechanically mixing starting materials to obtain a homogenous mixture, mixing a lithium starting material with a composition prepared by either mechanically mixing or co-precipitating starting materials to obtain a homogenous mixture.

An embodiment of the process of the invention relates to a lithium positive electrode active material comprising at least 95 wt % of spinel phase $Li_xNi_yMn_{2-y}O_4$; $0.9 \leq x \leq 1.1$, and $0.4 \leq y \leq 0.5$.

Another aspect of the invention relates to positive electrode active materials prepared according to the process of the present invention. An aspect of the invention relates to lithium positive electrode active materials prepared via a novel lithium positive electrode active material intermediate of the invention.

Yet another aspect of the invention relates to the use of the positive electrode active material prepared according to the process of the present invention for a secondary battery.

EXAMPLES

In the following, exemplary and non-limiting embodiments of the invention are described. Example A describes a method of electrochemical testing, whilst Examples 1-11 relate to methods of preparation, and characterization of the intermediate.

EXAMPLE A

Method of Electrochemical Testing of Lithium Positive Electrode Active Materials Prepared According to Examples 1, 7 and 11

Electrochemical tests have been realized in 2032 type coin cells, using thin composite positive electrodes and metallic lithium negative electrodes (half-cells). The thin composite positive electrodes were prepared by thoroughly mixing 84 wt % of lithium positive electrode active material (prepared according to Examples 1, 7 and 11) with 8 wt % Super C65 carbon black (Timcal) and 8 wt % PVdF binder (polyvinylidene difluoride, Sigma Aldrich) in NMP (N-methyl-pyrrolidone) to form a slurry. The slurries were spread onto carbon coated aluminum foils using a doctor blade with a 100 µm gap and dried for 12 hours at 80° C. to form films. Electrodes with a diameter of 14 mm and a loading of approximately 4 mg of lithium positive electrode active material were cut from the dried films, pressed in a hydraulic pellet press (diameter 20 mm; 5 tonnes) and subjected to 10 hours drying at 120° C. under vacuum in an argon filled glove box.

Coin cells were assembled in argon filled glove box (<1 ppm $O_2$ and $H_2O$) using two polymer separators (Toray V25EKD and Freudenberg FS2192-11SG) and electrolyte containing 1 molar $LiPF_6$ in EC:DMC (1:1 in weight). Two 135 µm thick lithium disks were used as counter electrodes and the pressure in the cells were regulated with a stainless steel disk spacer and disk spring on the negative electrode side. Electrochemical lithium insertion and extraction was monitored with an automatic cycling data recording system (Maccor) operating in galvanostatic mode.

A power test was programmed to run the following cycles: 3 cycles 0.2 C/0.2 C (charge/discharge), 3 cycles 0.5 C/0.2 C, 5 cycles 0.5 C/0.5 C, 5 cycles 0.5 C/1 C, 5 cycles 0.5 C/2 C, 5 cycles 0.5 C/5 C, 5 cycles 0.5 C/10 C, and then 0.5 C/1 C cycles with a 0.2 C/0.2 C cycle every $20^{th}$ cycle. C-rates were calculated based on the theoretical specific capacity of the material of 148 mAhg$^{-1}$ so that e.g. 0.2 C corresponds to 29.6 mAg$^{-1}$ and 10 C corresponds to 1.48 Ag$^{-1}$.

Example 1

Method of Preparing Lithium Positive Electrode Active Material $Mn_3O_4$ (240 g corresponding to 3.16 mol Mn), basic $Ni(OH)_x(CO_3)_y$ (131 g corresponding to 0.92 mol Ni), $Li_2CO_3$ (76.8 g corresponding to 2.08 mol Li) were weighed and ball-milled (600 rpm for 30 min with reverse rotation) in a planetary ball mill. The mixture was then dried at 120° C. for 12 hours. Graphite [0.86 g; C-NERGY Graphite (Low Fe content) from TimCal] was added to the mixture of starting materials (40 g) and mixed in a mortar for 15 min to obtain a precursor. The precursor was heated (step a.) in a 50 mL crucible with lid for 3 hours at 900° C., followed by cooling of 1° C./min to room temperature. Upon cooling, the product had contracted into a hard lump that was broken down in a mortar. After further grinding for 15 min achieving a D50 of approximately 250 µm. The tap density of the material was 2.7 g cm$^{-3}$.

The lithium positive electrode active material intermediate was heated for a second time (step b.) for 3 hours in air at 900° C., followed by cooling to room temperature. The tap density of the material was 2.4 g cm$^{-3}$.

In Examples 1-3, 7 and 11 (corresponding to Tables 1-3 and 8) an additional step c. has been added. Step c. comprises heating the product of step b for a third time for 10 hours at 900° C. with slow cooling to 700° C. (1° C. per minute), followed by cooling to room temperature. The tap density of the material was 2.1 g cm$^{-3}$ (d50 approx. 70 um). The phase composition of the lithium positive electrode active material obtained comprised more than 95 wt % spinel phase.

TABLE 1

| Step | Heating atmosphere | Heating time (hours) | Tap Density (g cm$^{-3}$) | Yield (%) | Mass change (%) | Spinel (wt %) |
|---|---|---|---|---|---|---|
| a. | Reducing | 3 | 2.7 | 79.6% | N/A | <80 |
| b. | Non-reducing | 3 | 2.4 | 81.4% | 1.8 | >80 |
| c. | Non-reducing | 10 | 2.1 | 82.9% | 1.5 | >95 |

"Spinel" means spinel phase.

"Yield" means the mass of the product of step a, b or c compared to the total mass of the starting materials excluding any added substances to create the reducing atmosphere; i.e. graphite for Examples 1-3 and 7.

"Mass change" means the difference in mass between the products of step a. and b., or b. and c relative to the mass of the starting materials.

The mass change between the mass of the intermediate obtained after the first heating (step a.) under a reducing atmosphere and the material obtained after the second heating under a non-reducing atmosphere (step b.) is +1.8%. The total mass change between the products of steps a. and c. is +3.3%. A +3.3% mass increase corresponds to a change in δ of 0.4 in the formula $Li_xNi_yMn_{2-y}O_{4-\delta}$.

Example 2

Method of Preparing Lithium Positive Electrode Active Material

The procedure as described in Example 1 was followed; the heating times were varied as shown in Table 2.

TABLE 2

| Step | Heating atmosphere | Heating time (hours) | Tap Density (g cm$^{-3}$) | Yield (%) | Mass change (%) | Spinel (wt %) |
|---|---|---|---|---|---|---|
| a. | Reducing | 3 | 2.6 | 79.8 | N/A | <80 |
| b. | Non-reducing | 10 | 2.2 | 82.2 | 2.4 | >80 |
| c. | Non-reducing | 10 | 2.0 | 83.1 | 0.9 | >95 |

The mass change between the mass of the intermediate obtained after the first heating under a reducing atmosphere and the material obtained after the second heating under a non-reducing atmosphere is 2.4%. The total mass change between the products of steps a. and c. is +3.3%. A +3.3% mass increase corresponds to a change in δ of 0.4 in the formula $Li_xNi_yMn_{2-y}O_{4-\delta}$.

Example 3

Method of Preparing Lithium Positive Electrode Active Material

The procedure as described in Example 1 was followed; the heating times were varied as shown in Table 3.

TABLE 3

| Step | Heating atmosphere | Heating time (hours) | Tap Density (g cm$^{-3}$) | Yield (%) | Mass change (%) | Spinel (wt %) |
|---|---|---|---|---|---|---|
| a. | Reducing | 10 | 2.0 | 82.5 | N/A | <90 |
| b. | Non-reducing | 10 | 1.9 | 82.9 | 0.4 | >90 |
| c. | Non-reducing | 3 | 1.9 | 83.0 | 0.1 | >95 |

The mass change between the mass of the intermediate obtained after the first heating under a reducing atmosphere and the material obtained after the second heating under a non-reducing atmosphere is +0.4%. The total mass change between the products of steps a. and c. is +0.5%. A +0.5% mass increase corresponds to a change in δ of 0.06 in the formula $Li_xNi_yMn_{2-y}O_{4-\delta}$.

It should be noted that the first heating step (step a.) of Example 3 has a duration of 10 hours, in comparison to 3 hours for Examples 1 and 2. Example 3 has a higher amount of the intermediate material in the spinel phase than Examples 1 and 2, this amount of spinel material is caused by a change in the concentration of the reducing atmosphere over time, therefore the material that is heated for a longer duration experiences a less reducing (more oxidizing) atmosphere as the heating proceeds. Therefore the spinel phase of the intermediate corresponds to the concentration of oxidizing species in the reducing atmosphere, rather than directly corresponding to the duration of heating.

Example 4

Method of Preparing Precursor for Lithium Positive Electrode Active Material By Co-Precipitation A metal solution of $NiSO_4$ and $MnSO_4$ with a Ni:Mn atomic ratio of 1:3 was prepared by dissolving 258 g of $NiSO_4.7H_2O$ and 521 g of $MnSO_4.H_2O$ in 1775 g water. In a separate flask, an alkaline solution was prepared by dissolving 2862 g of $Na_2CO_3.10H_2O$ and 68 g $NH_3.H_2O$ in 2995 g water. The acid and the base are added separately into a continuously stirred tank reactor provided with vigorous stirring (650 rpm) and a temperature of 50° C. The volume of the reactor was 1 litre.

The product was continuously removed from the reactor, so that the residence time of the reactants in the reactor was 30 minutes.

Example 5

Method of Preparing Lithium Positive Electrode Active Material

Precursors in the form of 5626 g co-precipitated Ni,Mn-carbonate with a Ni:Mn atomic ratio of 1:3 and 884 g $Li_2CO_3$ (corresponding to a Li:Ni/Mn ratio of 1:2) are mixed with ethanol to form a viscous slurry. The slurry is shaken in a paint shaker for 3 min. in order to obtain full de-agglomeration and mixing of the particulate materials. The slurry is poured into trays and left to dry at 80° C. The dried material is further de-agglomerated by shaking in a paint shaker for 1 min in order to obtain a free flowing homogeneous powder mix.

The powder mix is sintered in a muffle furnace with Nitrogen flow. The heating profile is given in Table 4.

TABLE 4

| Temperature (° C.) | Ramp (° C./min) | Dwell (hours) | Gas | Gas flow (L/min) |
|---|---|---|---|---|
| RT-260 | 2 | | Nitrogen | 0.5 |
| 260-450 | 0.5 | | Nitrogen | 0.5 |
| 450-700 | 2 | | Nitrogen | 0.5 |
| 700 | | 2.5 | Nitrogen | 0.5 |
| 700 | | 4 | Air | 0.5 |
| 700-RT | natural cooling | | Air | 0.5 |

This intermediate product is de-agglomerated by shaking for 6 min. in a paint shaker and passed through a 45 micron sieve. The powder is sintered in a standard furnace in air according to the heating profile given in Table 5. The powder is distributed in alumina crucibles.

TABLE 5

| Temperature (° C.) | Ramp (° C./min) | Dwell (hours) | Gas | Gas flow (L/min) |
|---|---|---|---|---|
| RT-900 | 5 | | Air | 2 |
| 900 | | 14 | Air | 2 |
| 900-700 | 2.5 | | Air | 2 |
| 700 | | 4 | Air | 2 |
| 700-RT | Natural cooling | | Air | 2 |

The powder is again de-agglomerated by shaking for 6 min in a paint shaker and passed through a 45 micron sieve resulting in a lithium positive electrode active material consisting of 96.6 wt % spinel phase, 2.9 wt % O3 phase and 0.5 wt % rock salt phase. The tap density was determined to be 2.4 g cm$^{-3}$.

Example 6

Method of Preparing Lithium Positive Electrode Active Material

Precursors in the form of 5626 g co-precipitated Ni,Mn-carbonate with a Ni:Mn atomic ratio of 1:3 and 884 g $Li_2CO_3$ (corresponding to a Li:Ni/Mn ratio of 1:2) are mixed with ethanol to form a viscous slurry. The slurry is shaken in a paint shaker for 3 min. in order to obtain full de-agglomeration and mixing of the particulate materials. The slurry is poured into trays and left to dry at 80° C. The dried material is further de-agglomerated by shaking in a paint shaker for 1 min in order to obtain a free flowing homogeneous powder mix.

The powder mix is sintered in a muffle furnace with nitrogen flow. The heating profile is given in Table 6.

TABLE 6

| Temperature (° C.) | Ramp (° C./min) | Dwell (hours) | Gas | Gas flow (L/min) |
|---|---|---|---|---|
| RT-260 | 2 | | Nitrogen | 0.5 |
| 260-450 | 0.5 | | Nitrogen | 0.5 |
| 450-700 | 2 | | Nitrogen | 0.5 |
| 700 | | 2.5 | Nitrogen | 0.5 |
| 700-RT | natural cooling | | Nitrogen | 0.5 |

This intermediate product is sintered in a standard furnace in air according to the heating profile given in Table 7. The material is distributed in alumina crucibles.

TABLE 7

| Temperature (° C.) | Ramp (° C./min) | Dwell (hours) | Gas | Gas flow (L/min) |
|---|---|---|---|---|
| RT-700 | 5 | | Air | 8 |
| 700 | | 6 | Air | 8 |
| 700-900 | 5 | | Air | 8 |
| 900 | | 14 | Air | 8 |
| 900-700 | 2.5 | | Air | 8 |
| 700 | | 4 | Air | 8 |
| 700-RT | Natural cooling | | Air | 8 |

The powder is de-agglomerated by shaking for 6 min in a paint shaker and passed through a 45 micron sieve resulting in a lithium positive electrode active material consisting of 96.2 wt % spinel phase, 2.8 wt % O3 phase and 1.0 wt % rock salt phase. The tap density was determined to be 2.4 g cm$^{-3}$.

Example 7

Comparative Example

The procedure as described in Example 1 was followed; however, the atmosphere of steps a., b. and c. were all non-reducing. The heating times were varied as shown in Table 8.

TABLE 8

| Step | Heating atmosphere | Heating time (hours) | Tap Density (g cm$^{-3}$) | Yield (%) | Mass change (%) | Spinel (wt %) |
|---|---|---|---|---|---|---|
| a. | Non-reducing | 3 | 1.5 | 82.8 | N/A | >95 |
| b. | Non-reducing | 3 | 1.5 | 82.9 | +0.1% | >95 |
| c. | Non-reducing | 10 | 1.6 | 82.8 | −0.1% | >95 |

The mass change between the mass of the intermediate obtained after the first heating under a non-reducing atmosphere (step a.) and the material obtained after the second heating under a non-reducing atmosphere (step b.) is +0.1%. The total mass change between the products of steps a. and c. is +0.0%. A 0% mass increase corresponds to a constant value of δ in the formula Li$_x$Ni$_y$Mn$_{2-y}$O$_{4-\delta}$.

Figure 1:
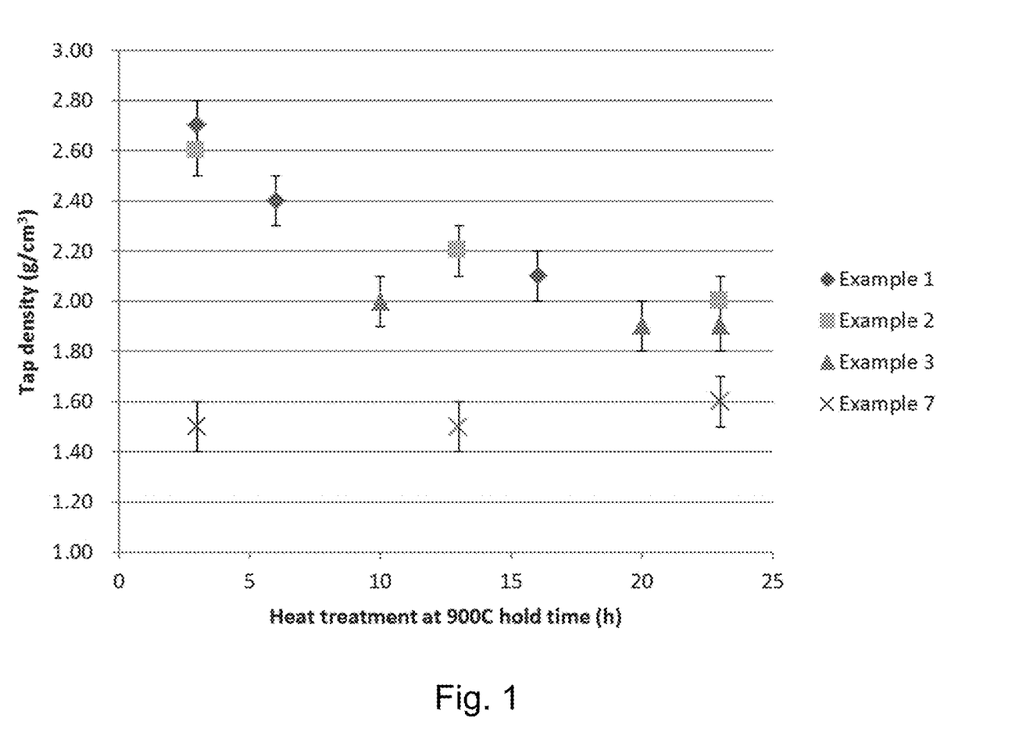
FIG. 1 shows the tap densities of the products of each step (a.-c.) for Examples 13 and 7.

FIG. 1 shows the tap densities of the products of each step (a.-c.) for Examples 1-3 and 7. FIG. 1 illustrates that Examples 1-3 show exceptional tap densities for the product of each step. Example 7 illustrates the slight increase (0.1 g cm$^{-3}$) in tap density with time when heated.

Figure 2:
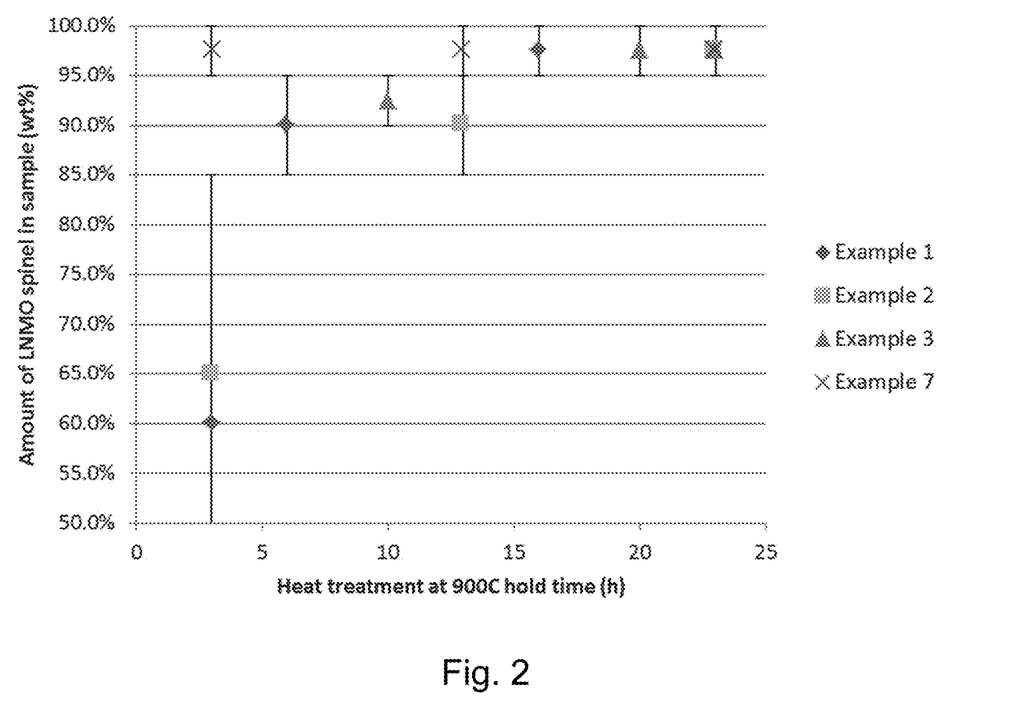
FIG. 2 shows the variation of the amount of spinel phase of the products of steps a. c. of Example 1-3 and 7.

FIG. 2 shows the variation of the amount of spinel phase of the products of steps a. c. of Example 1-3 and 7. Examples 1 and 2 demonstrate a significantly smaller amount of spinel phase, 60 wt % and 65 wt % respectively, in the lithium positive electrode active material intermediate (product of step a.).

Figure 7A:
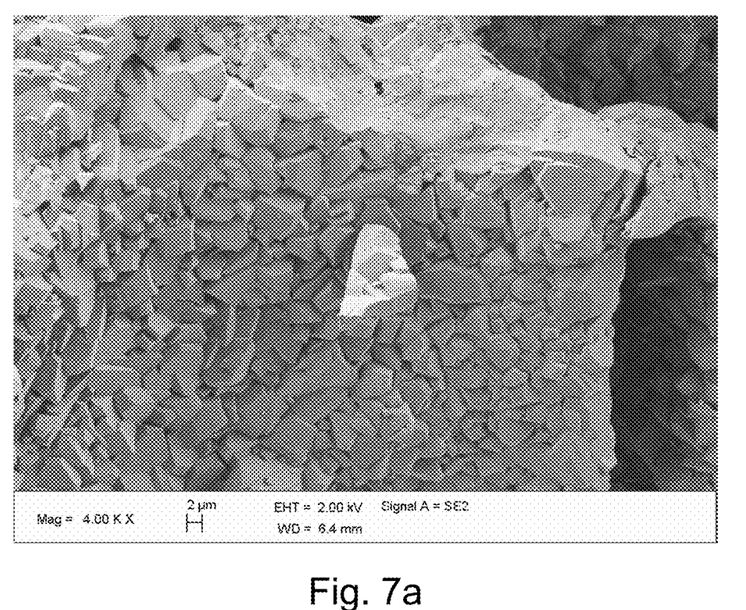
FIGS. 7a and 7b show SEM images of the lithium positive electrode active material intermediate (product of step a.) of Examples 1 and 7, respectively.

FIG. 7a shows a SEM image of the lithium positive electrode active material intermediate (product of step a.) of Example 1; i.e. where step a. is carried out under a reducing atmosphere.

Figure 7B:
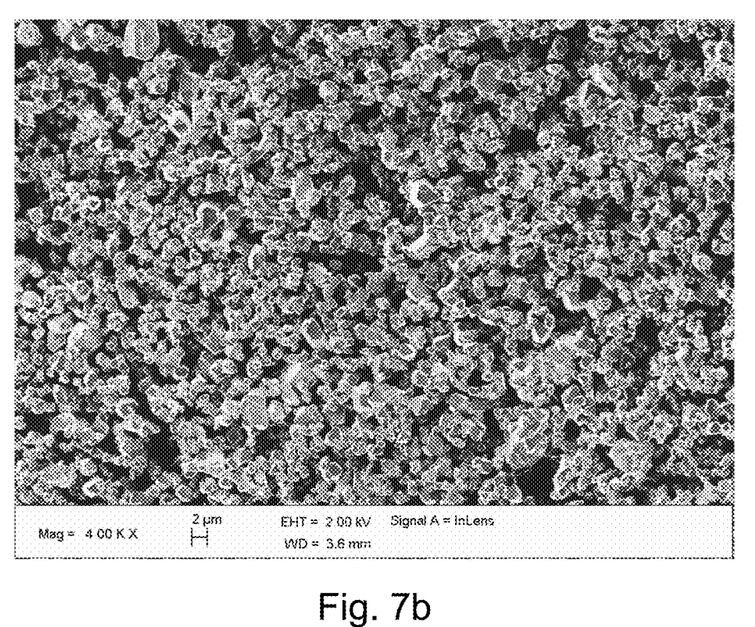

FIG. 7b shows a SEM image of the lithium positive electrode active material intermediate (product of step a.) of comparative Example 7; i.e. where step a. is carried out under a non-reducing atmosphere.

Example 8

Example 3 was repeated with varying amounts of graphite present in the precursor, see Table 9.

TABLE 9

Amount of graphite present in the precursor of Example 3.

| Sample | Graphite (g) |
|---|---|
| A - Comparative Example | 0.0 |
| B | 0.2 |
| C | 0.4 |
| D | 0.6 |
| E | 0.8 |
| F | 1.0 |
| G | 3.0 |

Figure 3:
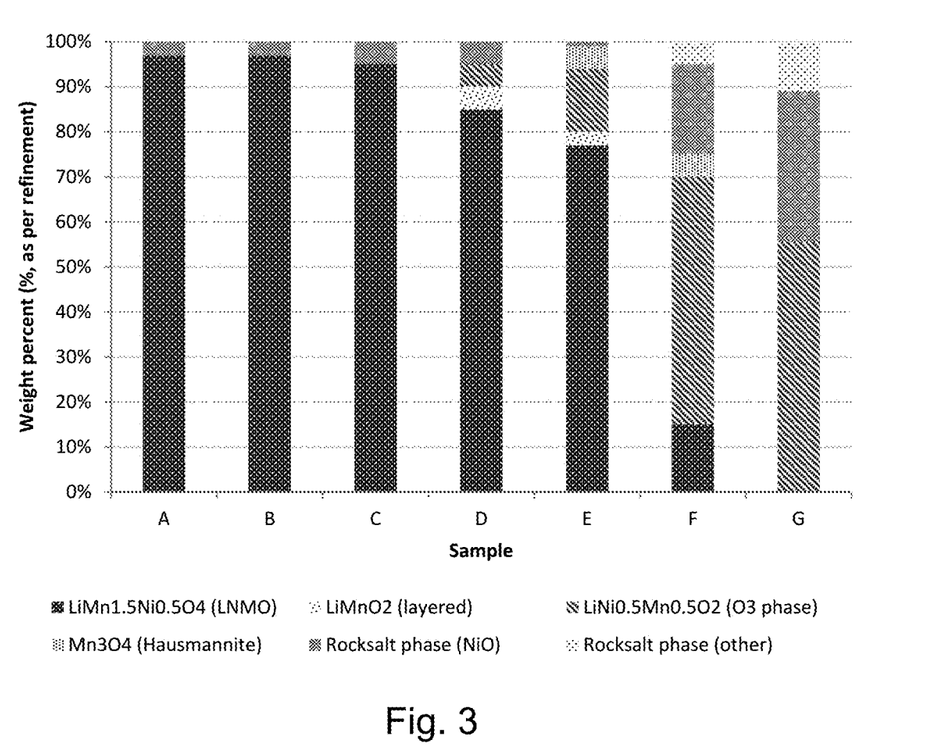
FIG. 3 shows the composition of phases of the lithium positive electrode active material intermediate for samples A-G of Example 8.

FIG. 3 shows the composition of phases of the lithium positive electrode active material intermediate for samples A-G of Example 8. FIG. 3 shows the correlation between the composition of phases of the lithium positive electrode active material intermediate (product of step a.) and the amount of oxygen present in the reducing atmosphere. The carbon present in the composition reacts with oxygen in the atmosphere of the sealed crucible and forms a carbon-oxygen compound such as carbon monoxide or carbon dioxide. Increasing the amount of graphite present in the composition to be calcined under a reducing atmosphere correlates to reducing the amount of oxygen present in the reducing atmosphere. FIG. 3 illustrates that the increase in graphite (i.e. decrease in oxygen present in the atmosphere of the process) results in a product comprising a lithium positive electrode active material intermediate (product of step a.) comprising metal oxide phases such as LiMnO$_2$ and Mn$_3$O$_4$, and impurities such as NiO/MnO rock-salt and other rock-salt solid-solutions of the form Ni$_x$Mn$_{1-x}$O for x larger than or equal to 0 and smaller than or equal to 1 [e.g.: MnO, Mn$_2$Ni$_3$O$_5$, Mn$_4$Ni$_6$O$_{10}$].

Figure 4:
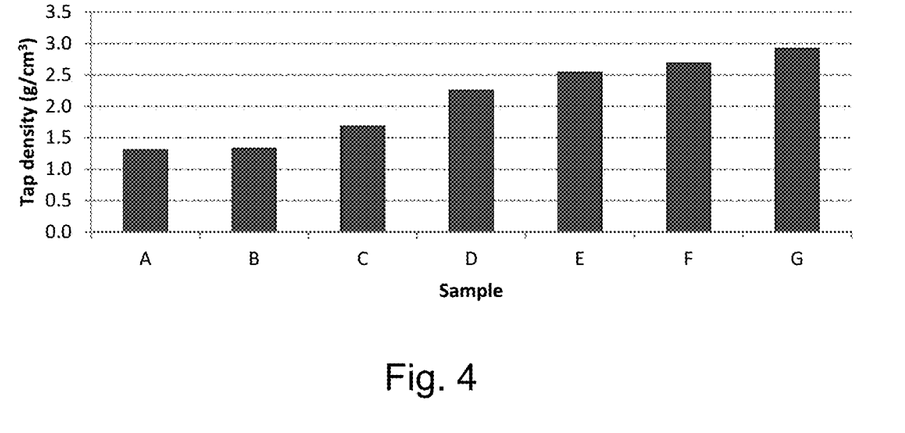
FIG. 4 shows the variation of the tap density of the product of samples A-G of Example 8.

FIG. 4 shows the variation of the tap density of the product of samples A-G of Example 8.

Similarly to FIG. 3, FIG. 4 illustrates the correlation between decreasing the percentage of oxygen in the atmosphere of the reducing atmosphere and the tap density of the material of the product of Example 8.

Example 9

In-Situ XRD Measurements During Synthesis

Phase distribution during the heat treatment process determined by in-situ XRD. A 0.2 g sample of mixed carbonate precursors is heated 1° C./min in Nitrogen atmosphere and in Air respectively in an in-situ X-ray diffraction set-up. XRD-scans were performed at 50° C. intervals from 25° C. to 900° C. The phase assembly has been identified and quantified using Rietveld refinement at each temperature step. The results are given in Table 10 and 11.

TABLE 10

Phase distribution of mixed carbonate precursors during a heat treatment process in nitrogen. The phase fractions are listed as relative fractions by weight, determined by Rietveld refinement. In all listed structures, M represents Mn, Ni or a mix of these and 0 ≤ x ≤ 1.

| Temp [° C.] | Li$_2$CO$_3$ | MCO$_3$ | Li$_x$M$_2$O$_4$ | M$_3$O$_4$ (s) | M$_3$O$_4$ (h) | Li$_x$MO | Ni |
|---|---|---|---|---|---|---|---|
| 25 | 22 | 78 | | | | | |
| 50 | 22 | 78 | | | | | |
| 100 | 22 | 78 | | | | | |
| 150 | 23 | 77 | | | | | |
| 200 | 25 | 75 | | | | | |

TABLE 10-continued

Phase distribution of mixed carbonate precursors during a heat treatment process in nitrogen. The phase fractions are listed as relative fractions by weight, determined by Rietveld refinement. In all listed structures, M represents Mn, Ni or a mix of these and $0 \leq x \leq 1$.

| Temp [° C.] | $Li_2CO_3$ | $MCO_3$ | $Li_xM_2O_4$ | $M_3O_4$ (s) | $M_3O_4$ (h) | $Li_xMO$ | Ni |
|---|---|---|---|---|---|---|---|
| 250 | 27 | 73 | | | | | |
| 300 | 32 | 68 | | | | | |
| 350 | 25 | | 25 | 37 | | 14 | |
| 400 | 18 | | 24 | 51 | | 8 | |
| 450 | 7 | | 50 | 25 | | 17 | |
| 500 | 4 | | 54 | 24 | | 18 | |
| 550 | 5 | | 47 | | 14 | 34 | |
| 600 | 6 | | 15 | | 16 | 64 | |
| 650 | | | | | | 100 | |
| 700 | | | | | | 99 | 1 |
| 750 | | | | | | 98 | 2 |
| 800 | | | | | | 97 | 3 |
| 850 | | | | | | 97 | 3 |
| 900 | | | | | | 98 | 2 |
| 25 | | | | | | 97 | 3 |

TABLE 11

Phase distribution of mixed carbonate precursors during a heat treatment process in air. The phase fractions are listed as relative fractions by weight, determined by Rietveld refinement. In all listed structures, M represents Mn, Ni or a mix of these and $0 \leq x \leq 1$.

| Temp [° C.] | $Li_2CO_3$ | $MCO_3$ | $Li_xM_2O_4$ | $M_3O_4$ (s) | $Li_xM_2O_3$ | $Li_xMO$ | Ni |
|---|---|---|---|---|---|---|---|
| 25 | 17 | 83 | | | | | |
| 50 | 17 | 83 | | | | | |
| 100 | 17 | 83 | | | | | |
| 150 | 17 | 83 | | | | | |
| 200 | 20 | 80 | | | | | |
| 250 | 20 | 80 | | | | | |
| 300 | 21 | 79 | | | | | |
| 350 | 24 | 76 | | | | | |
| 400 | 11 | | 34 | 14 | 41 | | |
| 450 | 5 | | 60 | 2 | 33 | | |
| 500 | 2 | | 71 | 1 | 26 | | |
| 550 | | | 75 | 5 | 20 | | |
| 600 | | | 76 | 9 | 15 | | |
| 650 | | | 80 | 13 | 7 | | |
| 700 | | | 82 | 16 | | | 2 |
| 750 | | | 80 | 16 | | | 4 |
| 800 | | | 80 | 12 | | | 8 |
| 850 | | | 72 | 11 | | 17 | |
| 900 | | | 54 | 16 | | 30 | |
| 25 | | | 94 | 3 | | 3 | |

"$Li_2CO_3$" means a crystal lattice described by space group C2/c with the lattice parameters a, b, c and β around 8.4 Å, 5.0 Å, 6.2 Å and 115°, respectively.

"$MCO_3$" means a crystal lattice described by space group R-3c with the lattice parameters a and b around 4.8 Å and 15.5 Å, respectively.

"$Li_xM_2O_4$" means a crystal lattice described by the space groups P4$_3$32 and Fd-3m for the cation ordered and disordered phase, respectively, with the lattice parameter a around 8.2 Å.

"$M_2O_3$" means a crystal lattice described by space group R-3R with the lattice parameters a and b around 5.4 Å and 54.1 Å, respectively.

"$M_3O_4$ (s)" means a crystal lattice described by space group Fd-3 mS with the lattice parameter a around 8.4 Å.

"$M_3O_4$ (h)" means a crystal lattice described by space group I41/amdZ with the lattice parameters a and c around 5.8 Å and 9.5 Å, respectively.

"$Li_xMO$" means a crystal lattice described by space group Fm-3m with the lattice parameter a around 4.2 Å. In some cases two $Li_xMO$ phases are identified with slightly different values of the lattice parameter a.

"Ni" means a crystal lattice described by space group Fm-3m with the lattice parameter a around 3.6 Å.

"$Li_2CO_3$" and "$MCO_3$" describe the precursor, "$Li_xM_2O_4$" and "$M_3O_4$ (s)" describe two different spinel phases, "$Li_xMO$" describes the rocksalt phases and "Ni" describes metallic nickel.

Example 10

Weight Increase of Intermediate Product During Heat Treatment in Air

Figure 5:
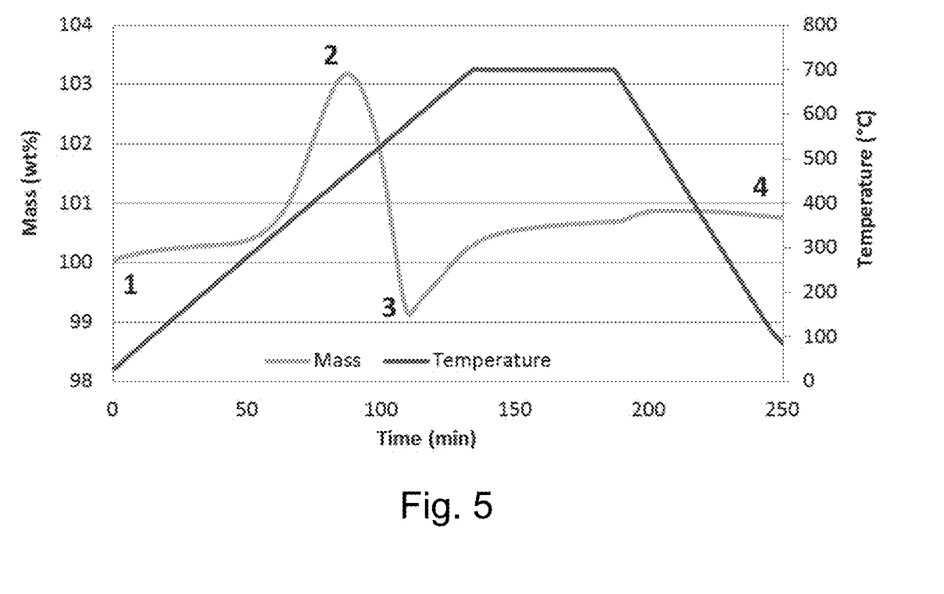
FIG. 5 shows a thermogravimetric analysis (TGA) curve of an oxidation of a lithium positive electrode active material intermediate.

FIG. 5 shows a TGA measurement of the oxidation (heat treatment in air) of the product from a heat treatment process in reducing atmosphere from room temperature to 900° C. and down to room temperature. Such a product is an example of a lithium positive electrode active material intermediate. A 1 g sample was tested with an air flow of 150 ml/min and a heating rate of 5° C./min.

The weight increases during the entire heating, except in the range from 500° C. to 600° C., where $Li_2CO_3$ decomposition dominates. The weight increase is a characteristic of the lithium positive electrode active material intermediate, but the amount may vary depending on the preparation and the amount of Li-precursor that will decompose during the heat treatment. Table 12 shows the mass at four characteristic points during the measurement. It is seen that the decomposition of $Li_2CO_3$ amounts to at least 4.05 wt %. The minimum oxidation weight gain thus amounts to 4.81 wt %. The net oxidation weigh gain of 0.76 wt % is masked by the loss contribution from decomposition of $Li_2CO_3$ in the temperature range 300-600° C.

TABLE 12

Weight of a lithium positive electrode active material intermediate during heat treatment in air.

| | Temp [° C.] | Mass [mg] | Gain [mg] | Loss [mg] |
|---|---|---|---|---|
| 1 | 30 | 1000.0 | | |
| 2 | 470 | 1031.8 | 31.8 | |
| 3 | 580 | 991.3 | | 40.5 |
| 4 | 30 | 1007.6 | 16.3 | |
| Total | | | 48.1 (4.81%) | 40.5 (4.05%) |

Example 11

Method of Preparing Lithium Positive Electrode Active Material

The method of Example 1 was followed; however, acetic acid [glacial, Sigma Aldrich] was added to the mixture of starting materials instead of graphite. The lithium positive electrode active material produced in this way had a tap density of 1.9 g cm$^{-3}$ and 98 wt % of spinel phase.

The material was subjected to charge-discharge cycling test; an initial specific discharge capacity of 130 mAhg$^{-1}$ was obtained and a stability of less than 7% decrease in discharge capacity after 100 cycles between 3.5-5.0 V at 55° C.

Figure 6:
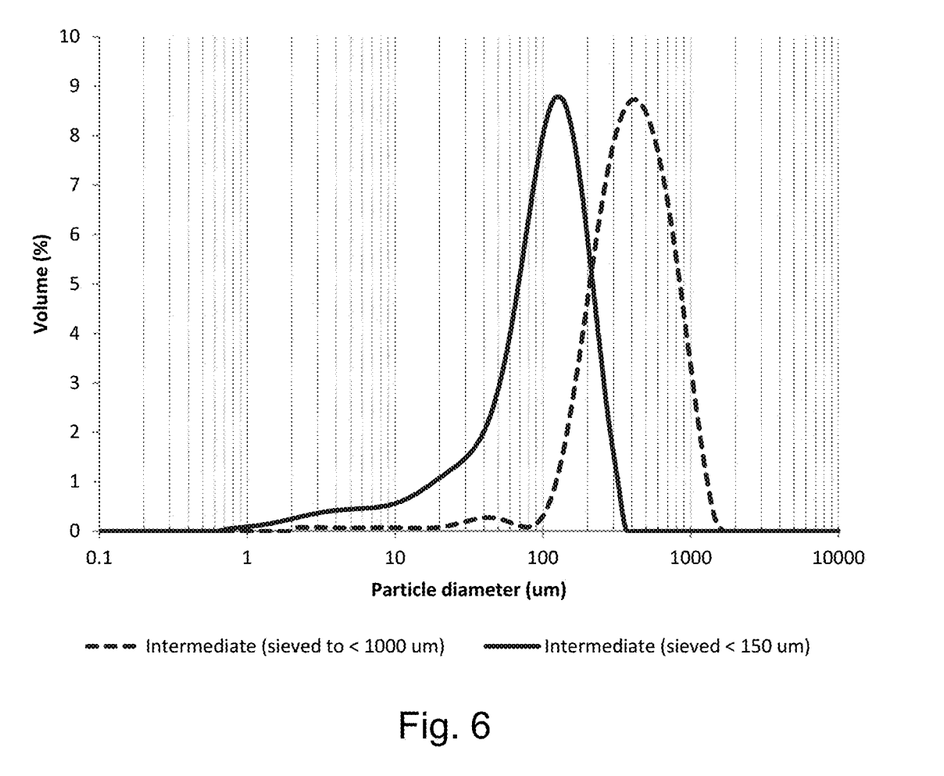
FIG. 6 shows the secondary particle size distribution of the lithium positive electrode active material intermediate after the first heating step (step a.) of Example 11.

FIG. 6 shows the secondary particle size distribution of the lithium positive electrode material intermediate after the first heating step (step a.) of Example 11. After light grinding, the material has a particle size distribution corresponding to a D10 of greater than 100 μm, D50 of greater than 250 μm and D90 of greater than 800 μm (dashed line). After further grinding and classification (sieving) to less than 150 μm, a D10 of around 30 μm, D50 of around 120 μm and D90 of around 200 μm are obtained (solid line).

TABLE 13

Power test (cycle 9-31) and electrochemical cycling test (from cycle 32) at 25° C. and 55° C.

| Temperature of Power Test | Atmosphere in heating step a. | Example | Capacity Fade per 100 cycles | Power capability |
|---|---|---|---|---|
| 25 | Non-reducing | 7 | 2.3% | 71% |
| 25 | Reducing | 11 | 1.4% | — |
| 25 | Reducing | 1 | 1.1% | 85% |
| 55 | Non-reducing | 7 | 7.9% | 76% |
| 55 | Reducing | 11 | 4.2% | 85% |
| 55 | Reducing | 1 | 3.9% | 83% |

"Power capability" means the specific discharge capacity available at 1.48 $Ag^{-1}$ (10C) compared to the specific discharge capacity available at 148 $mAg^{-1}$ (1C). Testing was measured between 3.5 to 5.0 V at discharge and charge rates according to Example A.

Figure 8:
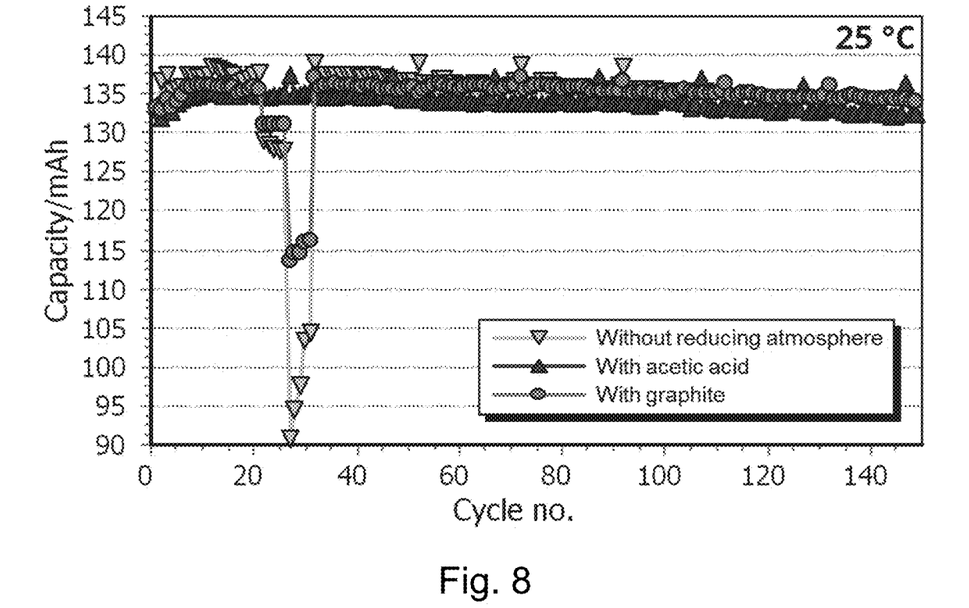
FIGS. 8 and 9 show power tests and electrochemical cycling tests at 25° C. and 55° C. of the lithium positive electrode active materials described in Examples 1, 7 and 11.

FIG. 8 shows a power test (cycles 9-31) and electrochemical cycling test (from cycle 32) at 25° C. The lithium positive electrode active materials described in Examples 1 and 11 have exceptional stability wherein the capacity of the lithium positive electrode active material decreases by no more than 2% over 100 cycles between from 3.5 to 5.0 V at 25° C. at discharge and charge rates according to Example A. This is significantly better than the product described in the comparative Example 7.

Figure 9:
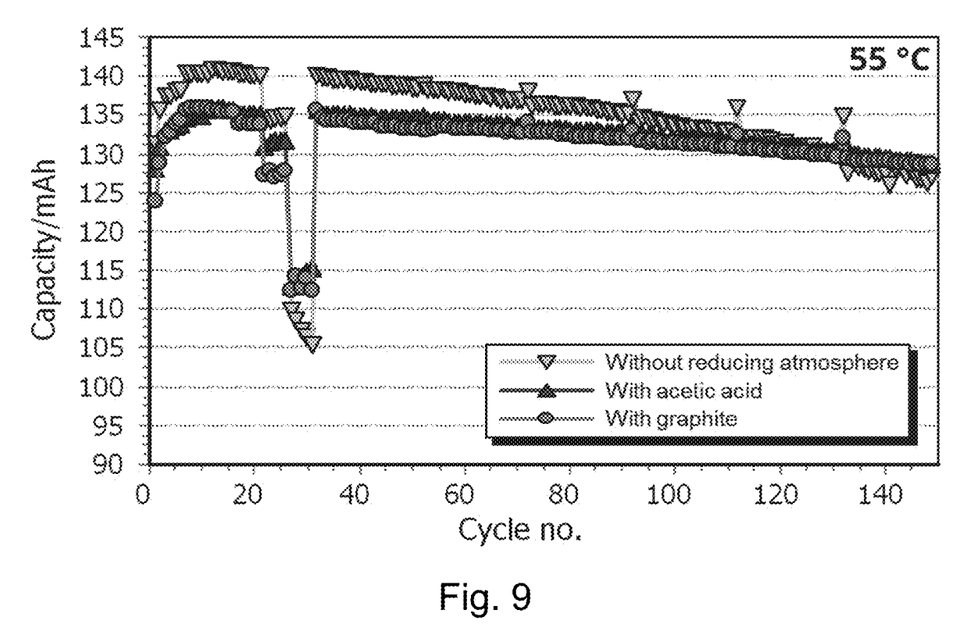

FIG. 9 shows power test (cycles 9-31) and electrochemical cycling test (from cycle 32) at 55° C. The lithium positive electrode active materials described in Examples 1 and 11 (with graphite and acetic acid) have good stability wherein the capacity of the lithium positive electrode active material decreases by around 4% over 100 cycles between from 3.5 to 5.0 V at 55° C. The lithium positive electrode active material described in the comparative Example 7 (without reducing atmosphere) has a much lower stability of 7.9% decrease in capacity over 100 cycles. Testing is performed according to Example A.

Figure 10:
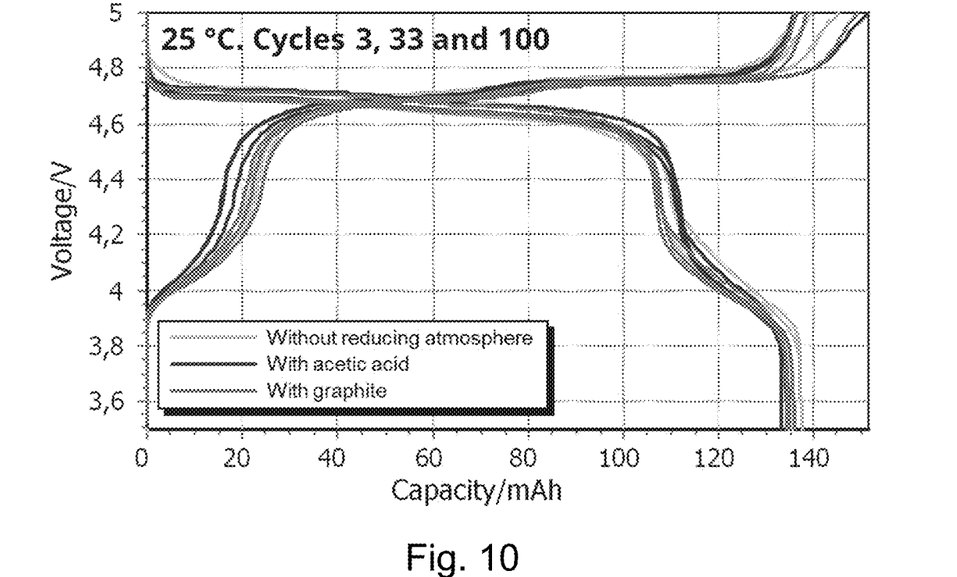
FIGS. 10 and 11 show voltage curves of specific electrochemical cycles at 25° C. and 55° C. of the lithium positive electrode active materials described in Examples 1, 7 and 11.

FIG. 10 shows voltage curves of the specific electrochemical cycle 3 (0.2 C/0.2 C) and cycle 33 and 100 (both 0.5 C/1.0 C) at 25° C. of the lithium positive electrode active materials described in Examples 1, 7 and 11. Testing is performed according to Example A.

Figure 11:
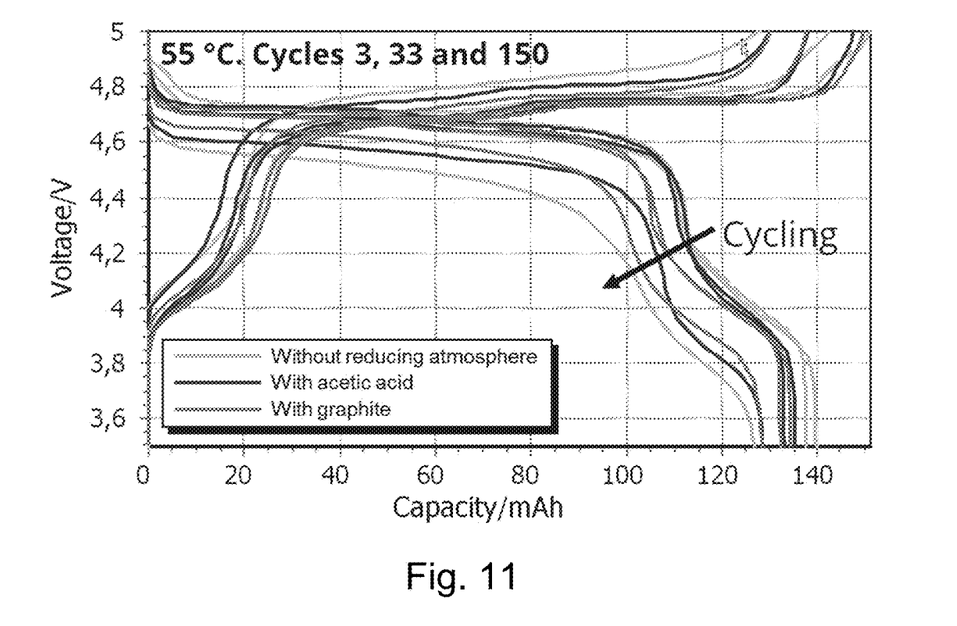

FIG. 11 shows voltage curves of the specific electrochemical cycle 3 (0.2 C/0.2 C) and cycle 33 and 150 (both 0.5 C/1.0 C) at 55° C. of the lithium positive electrode active materials described in Examples 1, 7 and 11. Testing is performed according to Example A.

The invention claimed is:

1. A process for the preparation of a lithium positive electrode active material for a high voltage secondary battery, where the cathode is fully or partially operated above 4.4 V vs. Li/Li+, said process comprising the steps of:
 a. heat treating a precursor comprising lithium in a reducing atmosphere at a temperature of between 300° C. and 750° C. to obtain the lithium positive electrode active material intermediate;
 b. heat treating the product of step a. in a non-reducing atmosphere at a temperature of between 700° C. and 1200° C.;
 wherein the mass of the product of step b. increases by at least 0.25% compared to the mass of the product of step a,
 wherein the reducing atmosphere is selected from the group consisting of a gas containing less than 15 vol % oxygen and a gas containing an added substance, which is capable of removing all or part of oxidizing species present in the gas.

2. A process according to claim 1, wherein the mass of the product of step b. increases by at least 0.75% compared to the mass of the product of step a.

3. A process according to claim 1, wherein the temperature of step a. is between 400° C. and 750° C.

4. A process according to claim 1, wherein the temperature of step b. is between 800° C. and 1200° C.

5. A process according to claim 1, wherein the reducing atmosphere is a gaseous composition containing less than 15 vol % oxygen.

6. A process according to claim 1, wherein the reducing atmosphere is created by adding a substance to the precursor composition, by decomposition of the precursor or by adding a gaseous composition to the atmosphere in order to remove all or part of any oxidising species present in the atmosphere.

7. A process according to claim 1, wherein the non-reducing atmosphere is a gaseous composition selected from the group consisting of air, and a composition comprising at least 5 vol % oxygen in an inert gas.

8. A process according to claim 1, wherein the lithium positive electrode active material has a capacity of greater than 110 $mAhg^{-1}$.

9. A process according to claim 1, wherein the capacity of the lithium positive electrode active material decreases by no more than 7% over 100 cycles between from 3.5 to 5.0 V at 55° C.

10. A process according to claim 1, wherein the product of step b. has a tap density equal to or greater than 1.8 g $cm^{-3}$.

11. A process according to claim 1, wherein the secondary particle size of the product of steps a. and b. has a D10 of greater than 100 μm, D50 of greater than 250 μm and D90 of greater than 800 μm.

12. A process according to claim 1, wherein the precursor is prepared by one or more processes selected from the group consisting of mechanically mixing starting materials to obtain a homogenous mixture, mixing a lithium starting material with a composition prepared by either mechanically mixing or co-precipitating starting materials to obtain a homogenous mixture.

13. A process according to claim 1, wherein the positive electrode active material comprises at least 95 wt % of spinel phase $Li_xNi_yMn_{2-y}O_4$; wherein $0.9 \leq x \leq 1.1$, and $0.4 \leq y \leq 0.5$.

* * * * *